April 21, 1959
M. H. EMRICK
2,883,024
WEDGE-TYPE CLUTCHES
Filed July 6, 1956
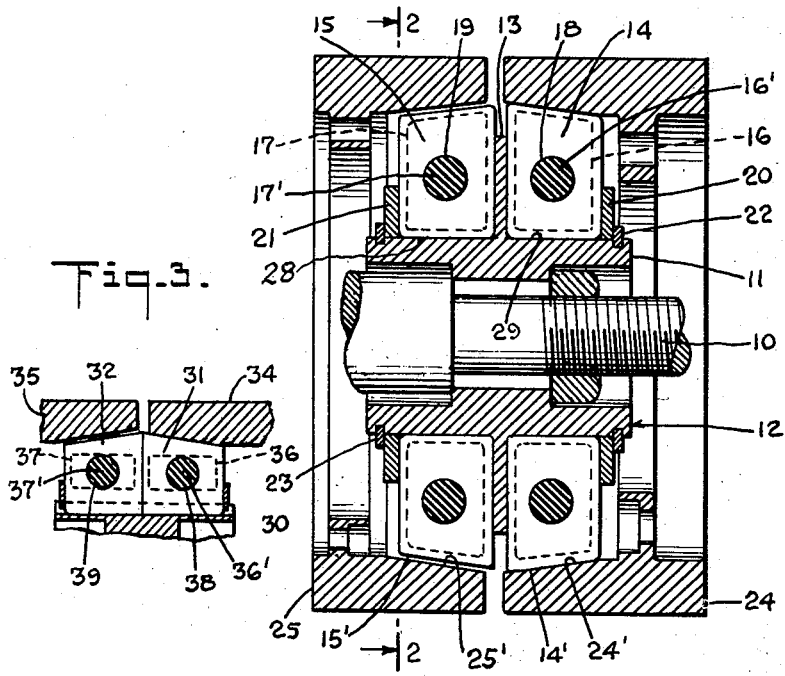
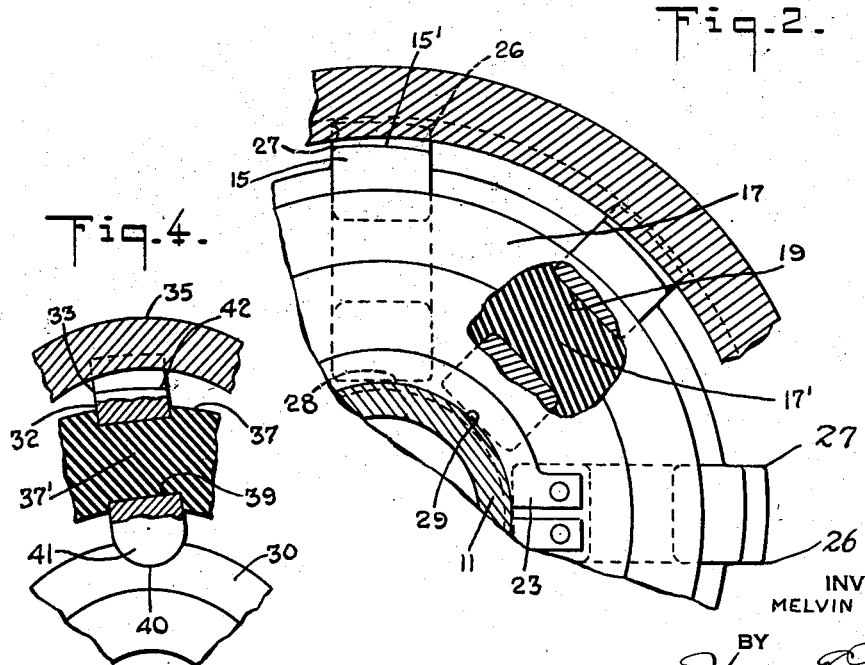
INVENTOR
MELVIN H. EMRICK
BY
Howard E. Thompson
ATTORNEY

United States Patent Office 2,883,024
Patented Apr. 21, 1959

2,883,024
WEDGE-TYPE CLUTCHES

Melvin H. Emrick, Manhasset, N.Y.; Dorothea A. Emrick, executrix of the estate of said Melvin H. Emrick, deceased Application July 6, 1956, Serial No. 596,208

5 Claims. (Cl. 192—48)

This invention relates to what are generally known as wedge-type clutches, employing a plurality of hardened and ground wedge elements spaced circumferentially of a driving axis, wherein the wedges are supported and spaced one from the other by a ring-like body of moulded rubber extending through apertures in said elements.

More particularly, the invention deals with a clutch structure involving forward and reverse drive bevelled clutch units movable into operative engagement with conical drivers in the forward and reverse drive of a device or mechanism in axial movement of the units into and out of engagement with said conical drivers.

The novel features of the invention will be best understood from the following description, when taken together with the accompanying drawing, in which certain embodiments of the invention are disclosed and, in which, the separate parts are designated by suitable reference character in each of the views and, in which:

Fig. 1 is a diagrammatic sectional view illustrating one type of unit which I employ and associated conical drivers, in connection with which the unit operates.

Fig. 2 is an enlarged partial sectional view on the line 2—2 of Fig. 1.

Fig. 3 is a view, generally similar to Fig. 1, showing only parts of the construction and showing a modification; and Fig. 4 is a broken diagrammatic view, generally similar to Fig. 2, diagrammatically illustrating one of the clutch wedge elements of the modification shown in Fig. 3, part of the construction being shown in section.

In illustrating one adaptation and use of my invention, I have illustrated a clutch employing a pair of clutch wedge units for establishing a forward and reverse drive through conical drivers, in other words, a clutch structure which is adaptable for use in conjunction with what are generally known as tapping attachments or other devices or mechanisms wherein both forward and reverse drives are required.

In Figs. 1 and 2 of the drawing, I have shown one adaptation of my invention and, in said figure, 10 represents a drive shaft, on which is mounted and keyed a hub portion 11 of a forward and reverse drive unit 12. The hub 11 includes a central outwardly extending fin or rib 13, at opposed sides of which are mounted forward drive wedge elements 14 and reverse drive wedge elements 15, these elements being circumferentially spaced around the axis of the hub by ring-like members 16 and 17, including portions 16', 17' which extend through apertures 18 and 19 in the wedges 14 and 15, respectively.

It will be noted, from a consideration of Fig. 1 of the drawing, that the rings 16 and 17 are maintained within peripheral limits of the wedges 14 and 15, adjacent surfaces of the wedges bearing upon the fin or rib 13 and the wedges are held against displacement from the hub by retainer rings 20, 21 held in place by split rings 22 and 23, detachable with respect to the hub 11.

In Fig. 1 of the drawing, I have diagrammatically illustrated at 24 the forward conical clutch driver and at 25 the reverse conical clutch driver, these drivers having bevelled surfaces 24', 25', in conjunction with which the wedges 14 and 15, respectively, operate as the shaft 10 is moved axially to bring the wedges 14 and 15 into operative engagement with the drivers.

Considering Fig. 2 of the drawing, it will be apparent that, in grinding the wedges 14 and 15, the bevelled surfaces 14', 15' of the wedges are ground on such a radius as to provide a leading edge 26, which is closer to the axis of the shaft 10 than the rear edge 27 so that, as the wedges are moved into engagement with the respective bevelled surfaces 24', 25' of the drivers 24 and 25, engagement of the edges 27, for example, with the surfaces, will cause the wedges to rock to bring the surfaces 14', 15' into positive gripping engagement with the respective drivers 24, 25.

In this last operation, the inner flat surfaces 28 of the wedges will pivot on the surface 29 of the hub 11. In the aforesaid operation, the yieldable properties of the rubber rings facilitate the aforesaid pivotal or rocking movement of the respective wedges.

While the foregoing description and application of the references have been applied to the showing in Fig. 2 of the drawing, which illustrates the wedges 15, it will be apparent that the same also applies to the wedges 14. The wedge structures are identical in general structure and are simply reversed to bring the forward and reverse drives, it being understood, in this connection, that the grinding of the surfaces is also consistent with the forward and reverse drives of the wedge elements.

In Figs. 3 and 4 of the drawing, I have shown a modification, wherein 30 represents a hub, generally similar to the hub 11, with the exception that the central wedge 13 is removed and, in Fig. 3, it will be noted that forward wedges are shown at 31 and reverse wedges at 32, these operating in conjunction with forward drivers 34 and reverse drivers 35, the latter being generally similar to the drivers 24 and 25. At 36 and 37 are shown rubber rings, generally similar to the rings 16 and 17, including portions 36', 37' which extend through apertures 38 and 39 in the wedges 31 and 32.

The primary differences between the structure of Figs. 3 and 4 and that of Figs. 1 and 2 reside in the fact that a fewer number of wedges are employed and, in Fig. 4 of the drawing, a diagrammatic view is shown of one of the wedges 32 and part of the ring 37. It will appear that the hub 30 has rounded recesses 40 spaced circumferentially thereof to receive rounded ends 41 of the wedges and, in moulding the rubber ring 37 on the spaced wedges 32, the wedges are disposed in an angular position to the radius of the axis of the hub 30; thus the leading edge 42 of the wedge 32 will be closer to the hub axis than the rear edge 33, thereby accomplishing the same result as is accomplished by the edges 26 and 27 of the structure shown in Figs. 1 and 2.

For simplification in the showing and disclosure, here again, reference is simply made to one of the series of wedge elements, namely the wedge elements 32. It will be apparent, however, that the wedge elements 31 are of the same construction, except that they are reversed with respect to the wedges 32. Otherwise, the structure of the wedges 31 and 32 will be generally the same as the wedges 14 and 15 of Figs. 1 and 2.

The structure of Figs. 3 and 4 provides a definite and positive positioning and keying of the wedges with the driving hub 30 by virtue of the rounded ends 41 fitting in the recesses 40. Further, this construction also provides a greater surface contact area of engagement between the driving hub and the wedges in the slight pivotal movement of the wedges in movement thereof into operative engagement with the conical drivers 34 and 35, respectively. It will be understood that, in the forward drive, the shaft, together with the hub, is moved axially in the direction of the forward conical driver 24, 34, in which position of the unit, the wedges 15 and 32, respectively, are out of engagement with the drivers 25, 35. Then, in moving the shaft or the hubs 11, 30 in the opposite direction, the wedges 14 and 31 immediately become disengaged from the drivers 24, 34 and the wedges 15 and 32 are then moved into operative engagement with the drivers 25 and 35, respectively.

It will also be apparent that, in the neutral position, both of the wedges 14, 15, 31, 32 are maintained in inoperative engagement with the respective drivers 24, 25 and 34, 35.

Wedge-type clutches, as defined, are applicable for use in tapping attachments substantially as shown and described in my prior Patent Number 2,778,238, granted January 22, 1957.

Having fully described my invention, what I claim as new and desire to secure by Letters Patent is:

1. A forward and reverse drive wedge clutch, comprising a drive unit, said unit including a rotatable and axially reciprocating shaft, said unit comprising a hub portion on said shaft, a pair of ring-like members of yieldable material encircling said hub portion at end portions thereof, a plurality of wedge elements embedded in and spaced by each member, inner ends of said elements bearing upon said hub portion, outer ends of said elements having bevelled surfaces, the elements of one member constituting the forward drive of the unit, the elements of the other member, the reverse drive of the unit, means including a fin on said hub for retaining said elements against axial movement on said hub, forward and reverse clutch drives encircling said unit and having bevelled surfaces adapted to be engaged by said forward and reverse wedge elements in axial movement of said shaft, and the bevelled surfaces of said wedges providing leading edges closer to the axis of said unit than opposed edges of said wedges, causing a rocking action of the wedges on said hub transverse to the axis thereof in movement of said wedges into operative engagement with said clutch drives.

2. A structure as defined in claim 1, wherein each wedge element has a central aperture receiving an integral part of said member.

3. A structure as defined in claim 1, wherein inner ends of the wedge elements are rounded and fitting in correspondingly formed recesses in said hub.

4. In a clutch of the character described, a drive unit having forward and reverse wedge drivers adapted to engage forward and reverse drive clutches, each driver comprising a yieldable ring having circumferentially spaced wedges united thereby, said unit including an axial reciprocating shaft, a hub portion fixed to said shaft, inner ends of said wedges bearing on said hub portion, means including a fin on the hub portion for retaining said wedges against axial movement on said hub portion, and outer ends of said wedges having bevelled surfaces providing leading edges closer to the axis of the unit than the opposed far edges thereof, thereby providing a rocking movement of the wedges transverse to the axis of the hub portion in movement of the wedges into clutch engaging position.

5. A structure as defined in claim 4, wherein said means includes retaining rings fixed to ends of the hub portion and engaging outer surfaces of said wedges.

References Cited in the file of this patent

UNITED STATES PATENTS

| | | |
|---|---|---|
| 2,240,359 | Weigel | Apr. 29, 1941 |
| 2,546,712 | Avila | Mar. 27, 1951 |
| 2,614,670 | Heintz | Oct. 21, 1952 |